(12) United States Patent
Li et al.

(10) Patent No.: US 10,209,543 B2
(45) Date of Patent: Feb. 19, 2019

(54) LCD PANEL, TERMINAL DEVICE AND PHOTO-SENSING CONTROL METHOD

(71) Applicant: Xiaomi Inc., Beijing (CN)

(72) Inventors: Guosheng Li, Beijing (CN); Anyu Liu, Beijing (CN); Yuan Zhang, Beijing (CN)

(73) Assignee: XIAOMI INC., Haidian District, Beijing ( * ) Notice: Subject to any disclaimer, the term of this patent is extended or adjusted under 35 U.S.C. 154(b) by 126 days.

(21) Appl. No.: 15/347,783

(22) Filed: Nov. 10, 2016

(65) Prior Publication Data

US 2017/0139250 A1    May 18, 2017

(30) Foreign Application Priority Data

Nov. 13, 2015   (CN) .......................... 2015 1 0780648

(51) Int. Cl.
*G02F 1/1335* (2006.01)
*G02F 1/133* (2006.01)
(Continued)

(52) U.S. Cl.
CPC ........ *G02F 1/13318* (2013.01); *G02F 1/1368* (2013.01); *G02F 1/13624* (2013.01);
(Continued)

(58) Field of Classification Search
None
See application file for complete search history.

(56) References Cited

U.S. PATENT DOCUMENTS

| 7,042,548 | B2 | 5/2006 | Zhang et al. |
| 9,122,349 | B1 | 9/2015 | Chang et al. |

(Continued)

FOREIGN PATENT DOCUMENTS

| CN | 1877401 A | 12/2006 |
| CN | 101191968 A | 6/2008 |

(Continued)

OTHER PUBLICATIONS

Extended European Search Report for European application No. 16194867.4 dated Mar. 9, 2017.
(Continued)

*Primary Examiner* — Richard H Kim
(74) *Attorney, Agent, or Firm* — Jun He Law Offices P.C.; James J. Zhu

(57) ABSTRACT

An LCD panel, a terminal device and a photo-sensing control method are provided. The LCD panel includes: a backlight source, an array substrate disposed on the backlight source; a photosensitive device array disposed on the array substrate; and a control circuit coupled to the photosensitive device array. By disposing the photosensitive device array on the array substrate of the LCD panel, a front panel of the terminal device is not required to be divided into multiple regions. Therefore, the camera function can be integrated into the LCD panel, and only the LCD panel is needed in the front panel of the terminal device which has both the display function and the camera function. The integration and appearance of the front panel of the terminal device is thus improved.

12 Claims, 14 Drawing Sheets

(51) Int. Cl.
*G02F 1/1343* (2006.01)
*G02F 1/1362* (2006.01)
*G02F 1/1368* (2006.01)
*G09G 3/36* (2006.01)

(52) U.S. Cl.
CPC .. *G02F 1/133514* (2013.01); *G02F 1/133528* (2013.01); *G02F 1/134336* (2013.01); *G02F 1/136286* (2013.01); *G09G 3/364* (2013.01); *G09G 3/3625* (2013.01); *G02F 2001/134345* (2013.01); *G02F 2201/52* (2013.01); *G09G 2360/144* (2013.01)

(56) References Cited

U.S. PATENT DOCUMENTS

| | | | |
|---|---|---|---|
| 2009/0073150 A1 | 3/2009 | Shih et al. | |
| 2014/0354597 A1* | 12/2014 | Kitchens, II | G06F 1/3215 345/175 |
| 2015/0029157 A1* | 1/2015 | Wang | G06F 3/03547 345/175 |

FOREIGN PATENT DOCUMENTS

| | | |
|---|---|---|
| CN | 101387771 A | 3/2009 |
| CN | 201742481 U | 2/2011 |
| CN | 102914921 A | 2/2013 |
| JP | H11125841 A | 5/1999 |
| JP | 2005010228 A | 1/2005 |
| JP | 2006343713 A | 12/2006 |
| JP | 5308666 B2 | 10/2013 |
| KR | 20060128242 A | 12/2006 |
| KR | 20080024662 A | 3/2008 |
| KR | 20130031277 A | 3/2013 |
| RU | 2206914 C2 | 6/2003 |

OTHER PUBLICATIONS

International Search Report for International application No. PCT/CN2015/098851, dated Aug. 12, 2016.

Molochkov V.P., "Tsifrovoe video dlya nachinayuschikh" (Digital video for beginners), "Piter", 2005, ISBN 5-469-00743-X, p. 302, Found in Internet on Jan. 10, 2018 https://books.google.ru/books?id=gdDKzILQwVoC&lpg=PP1&hl=ru&pg=PA302#v=onepage&q&f=true).

Russia Office Action and corresponding English Translation for Russia Application No. 2016118235/28(028592), dated Jan. 12, 2018.

International Search Report for PCT/CN2015/098851.

* cited by examiner

LCD PANEL, TERMINAL DEVICE AND PHOTO-SENSING CONTROL METHOD

CROSS-REFERENCE TO RELATED APPLICATIONS

This application is based upon and claims priority to Chinese Patent Application 201510780648.X, filed on Nov. 13, 2015, the entire contents of which are incorporated herein by reference.

TECHNICAL FIELD

The present disclosure generally relates to the field of liquid crystal display, and more particularly, to an LCD (liquid crystal display) panel, a terminal device and a photo-sensing control method.

BACKGROUND

A camera is a basic component commonly used in a mobile terminal for capturing images. Cameras may be classified into front cameras and rear cameras in term of their positions on the mobile terminal.

Taking the front camera as an example, it is generally disposed on a front panel of a mobile terminal having an LCD region and a bezel region, and specifically inside a small hole in the bezel region of the front panel.

SUMMARY

The present disclosure provides an LCD panel, a terminal device and a photo-sensing control method.

According a first aspect of the present disclosure, there is provided an LCD panel, including: a backlight source; an array substrate disposed on the backlight source; a photosensitive device array disposed on the array substrate; and a control circuit coupled to the photosensitive device array.

According to a second aspect of the present disclosure, there is provided a terminal device including the LCD panel according to the first aspect of the present disclosure. A photo-sensing control unit is further disposed in the terminal device, wherein the photo-sensing control unit is coupled to the data lines and the control lines.

According to a third aspect of the present disclosure, there is provided a photo-sensing control method for use with a photo-sensing control unit coupled to the LCD panel according to the first aspect of the present disclosure. The method includes: transmitting an enable signal to an i-th row of control line to turn on the connection between an i-th row of photosensitive device and a data line coupled thereto; and setting i=i+1 and transmitting the enable signal to the i-th row of control line again if i is smaller than b; or setting i=1 and transmitting the enable signal to the i-th row of control line again if i is equal to b.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
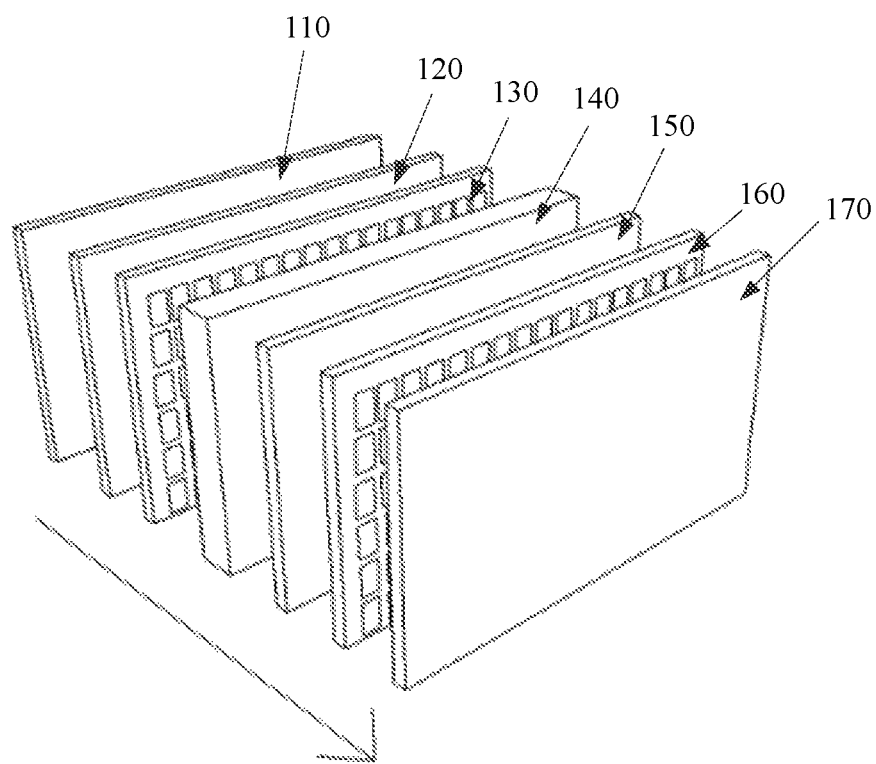
FIG. 1 is a structural diagram of a conventional LCD panel.

Before describing embodiments of the present disclosure, a brief introduction to an LCD (liquid crystal display) panel is made first. Referring to FIG. 1, a structural diagram of an LCD panel is illustrated.

As illustrated in FIG. 1, the LCD panel includes a backlight source 110, a lower polarizing sheet 120, an array substrate 130, a liquid crystal layer 140, an upper substrate 150, a color filter layer 160 and an upper polarizing sheet 170.

The lower polarizing sheet 120 is disposed on the backlight source 110, the array substrate 130 is disposed on the lower polarizing sheet 120, the liquid crystal layer 140 is disposed on the array substrate 130, the upper substrate 150 is disposed on the liquid crystal layer 140, the color filter layer 160 is disposed on the upper substrate 150, and the upper polarizing sheet 170 is disposed on the color filter layer 160.

The backlight source 110 provides backlight for the LCD panel, including but not limited to any one of Electro Luminescence (EL), Cold Cathode Fluorescent Lamp (CCFL), and Light Emitting Diode (LED).

The lower polarizing sheet 120 and the upper polarizing sheet 170 are configured to pass light having a particular direction, and the light transmission axes of the lower polarizing sheet 120 and the upper polarizing sheet 170 are perpendicular to each other.

The array substrate includes M×N pixel units each including K pixel subunits. Generally, each pixel unit includes three pixel subunits, which are R (red) pixel subunit, G (green) pixel subunit, and B (blue) pixel subunit. In some embodiments, each pixel unit includes four pixel subunits, which are R (red) pixel subunit, G (green) pixel subunit, B (blue) pixel subunit, and W (white) pixel subunit. That is, K may have a value of three or four.

Figure 2:
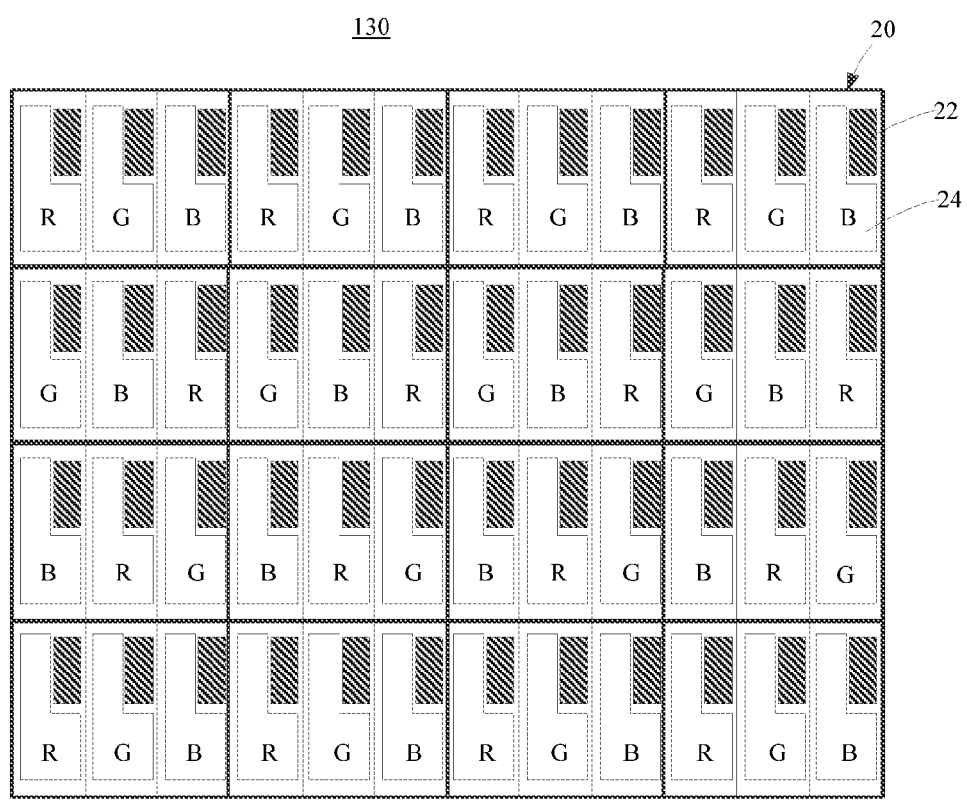
FIG. 2 is a structural diagram of an arrangement of pixel units of an array substrate.

FIG. 2 exemplarily illustrates an arrangement of the pixel units on the array substrate 130. As illustrated in FIG. 2, the region includes 4×4 (i.e., 16) pixel units, and each pixel unit includes three pixel subunits 20. Each pixel subunit 20 includes a Thin Film Transistor (TFT) region 22 which is opaque, and a transparent electrode region 24 which is transparent. That is, the backlight provided by the backlight source 110 may pass through the transparent electrode region 24 but not pass through the TFT region 22.

It should be noted that FIG. 2 illustrates only a portion of the array substrate 130, and the array substrate 130 may be formed of a plurality of regions as illustrated in FIG. 2. The arrangement illustrated in FIG. 2 is only exemplary and illustrative, and the present disclosure does not exclude other possible arrangements.

Liquid crystal molecules in the liquid crystal layer 140 are twisted under the control of the TFT region 22 in the array substrate 130, and transmit different amount of light depending on their respective twisting angles, thereby developing respective gray scales corresponding to the pixel units.

The color filter layer 160 is attached onto an upper surface of the upper substrate 150, such that the LCD panel may display color images. The color filter layer 160 includes color filter regions with three different colors R, G and B (red, green and blue, respectively) which are arranged in an array. Each of the color filter regions corresponds to a pixel subunit on the array substrate 130.

The light emitted from the backlight source 110 passes successively through the lower polarizing sheet 120, the transparent electrode region 24 on the array substrate 130, the liquid crystal layer 140, the upper substrate 150, the color filter layer 160 and the upper polarizing sheet 170. The array substrate 130 generates a voltage to control the twisting orientation of the liquid crystal molecules in the liquid crystal layer 140. The liquid crystal layer 140 changes the light brightness according to the orientation of the liquid crystal molecules, such that different pixel subunits correspond to the three colors R, G and B of the color filter layer have different gray scales to display an image.

Since each pixel subunit in the array substrate includes the opaque TFT region and the transparent electrode region, light directed towards the TFT region may be blocked when the light emitted from the backlight source passes through the array substrate. Accordingly, when the light arrives at the color filter layer, black shadow blocks which is also known as black matrix (BM) region, may develop on the regions of the color filter layer corresponding to the TFT regions. The BM regions have an arrangement substantially the same as or similar to that of the TFT region 22 of FIG. 2.

Figure 3A:
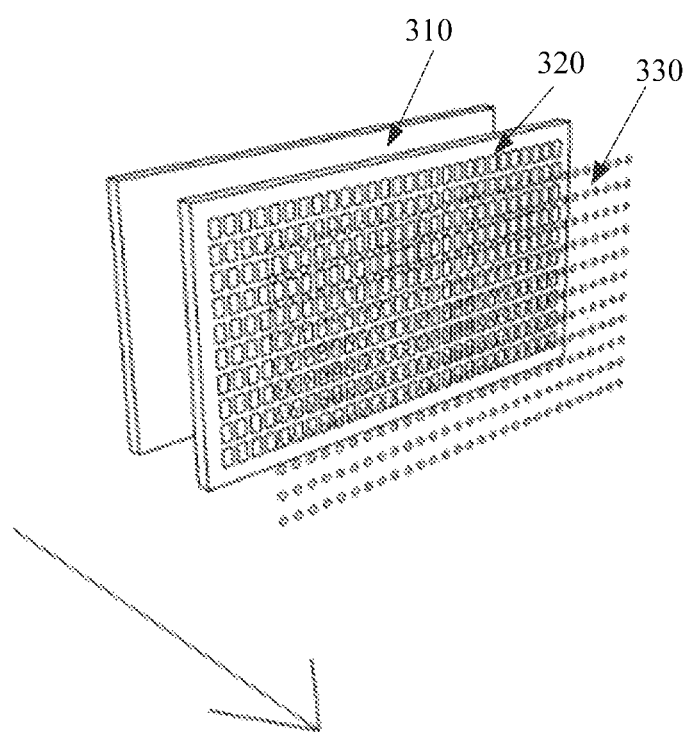
FIG. 3A is a structural diagram of an LCD panel according to an exemplary embodiment of the present disclosure.

FIG. 3A is a structural diagram of an LCD panel according to an exemplary embodiment of the present disclosure. The LCD panel may be an LCD panel of an electronic device such as a mobile phone, a tablet computer, a laptop computer or the like. As illustrated in FIG. 3A, the LCD panel includes: a backlight source 310; an array substrate 320 disposed on the backlight source; a photosensitive device array 330 disposed on the array substrate, wherein the photosensitive device array 330 includes a plurality of photosensitive devices that are configured to capture an image together; and a control circuit (not illustrated) coupled to the photosensitive device array 330.

Alternatively, the lower polarizing sheet as illustrated in FIG. 1 can be further disposed between the backlight source 310 and the array substrate 320. Moreover, structures such as the liquid crystal layer, the upper substrate, the color filter layer and the upper polarizing sheet (not illustrated) as illustrated in FIG. 1 may be further disposed on the array substrate 320.

In conclusion, for the LCD panel provided in the present embodiment, since the photosensitive device array is disposed on the array substrate of the LCD panel, it is solved that a front panel of the terminal device is usually required to be divided into multiple regions. Therefore, the camera function may be integrated into the LCD panel, and only the LCD panel is needed in the front panel of the terminal device which has both the liquid display function and the camera function. The integration and appearance of the front panel of the terminal device is thus improved.

In the alternative embodiment provided according to the embodiment of FIG. 3A, the photosensitive device array 330 includes A×B photosensitive devices, and each photosensitive device corresponds to a pixel subunit in the array substrate 320. In this case, each of M, N, K, A, and B is an integer greater than 0, and A≤K×M and B≤N. When viewed from the front of the LCD panel, each photosensitive device has a cross sectional area smaller than that of a pixel subunit, so as to avoid affecting light transmission through the pixel subunit. While capturing an image, each photosensitive device is configured to capture light sensing signal of a pixel subunit.

In an embodiment, the number of the photosensitive devices may vary in the following two situations.

I. The number of the photosensitive devices is equal to the number of the pixel subunits in the array substrate, i.e., A=K×M, and B=N.

II. The number of the photosensitive devices is smaller than the number of pixel subunits in the array substrate, i.e., A<K×M, and B<N, or A<K×M, and B=N, or A=K×M, and B<N.

In order to avoid that the photosensitive devices block the normal display of the pixel subunits and that dark spots develop on the LCD panel due to the blocking of the photosensitive devices, optionally, at least one photosensitive device is positioned on the TFT region 22 of a pixel subunit 20. In other words, since the TFT region 22 is opaque, each photosensitive device may be optionally positioned on the TFT region 22 of a pixel subunit 20. However, it is not excluded that in some embodiment, some photosensitive devices are positioned on the transparent electrode region 24 of the pixel subunit 20. When the photosensitive device is formed on the transparent electrode region 24, dark spots may develop accordingly.

In some embodiments, all of the photosensitive devices may be positioned on the TFT region 22 of the corresponding pixel subunits 20 in consideration of light transmission of the LCD panel.

Depending on the number of the photosensitive devices, the positioning of the photosensitive devices are illustrated in the following situations.

I. The photosensitive devices are disposed on the entire region of the LCD panel, and each photosensitive device corresponds to a pixel subunit in the array substrate, wherein A=K×M, and B=N.

Figure 3B:
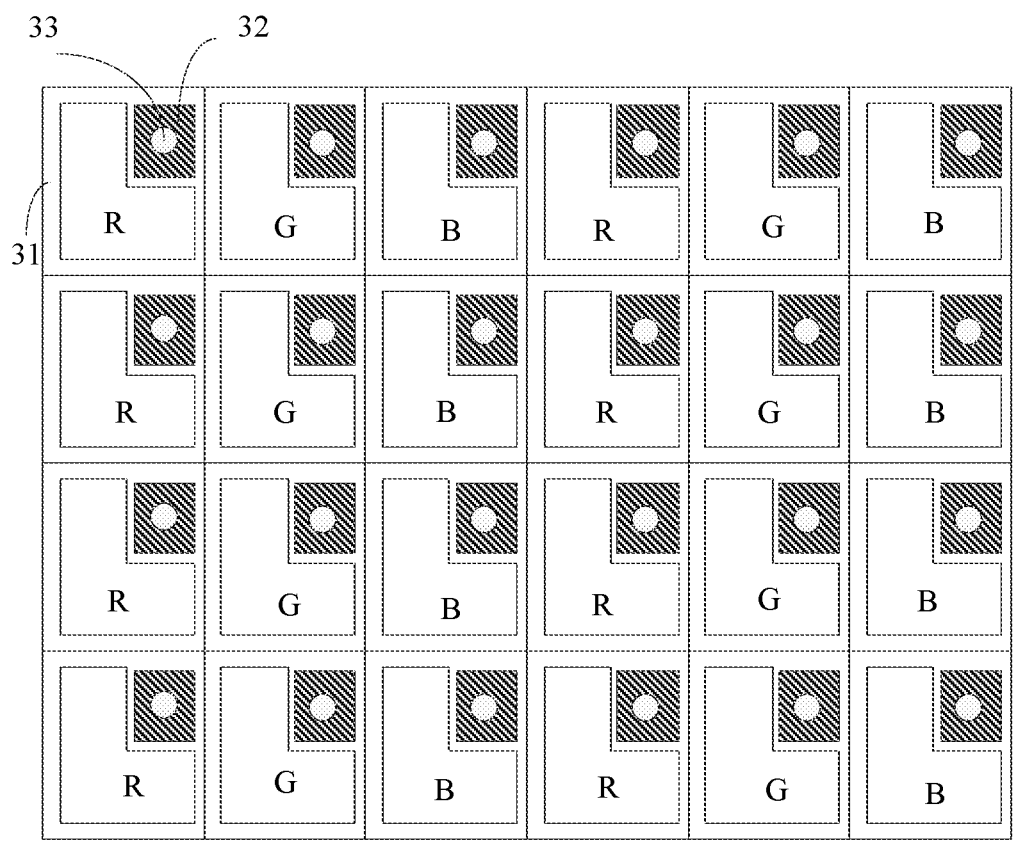
FIG. 3B is a structural diagram of positioning of a photosensitive device according to an exemplary embodiment of the present disclosure.

That is, a photosensitive device is disposed on each pixel subunit. As illustrated in FIG. 3B, the LCD panel includes 2×4 pixel units, and thus 8×3=24 pixel subunits 31. The LCD panel further includes 6×4 photosensitive devices, that is, 24 photosensitive devices. A photosensitive device 33 is disposed on the TFT region 32 of a pixel subunit 31.

II. The photosensitive devices are disposed in a portion of the LCD panel, and the photosensitive devices in the portion of the LCD panel correspond to the pixel subunits in the array substrate, where A<K×M and B<N, or A<K×M and B=N, or A=K×M and B<N.

Figure 3C:
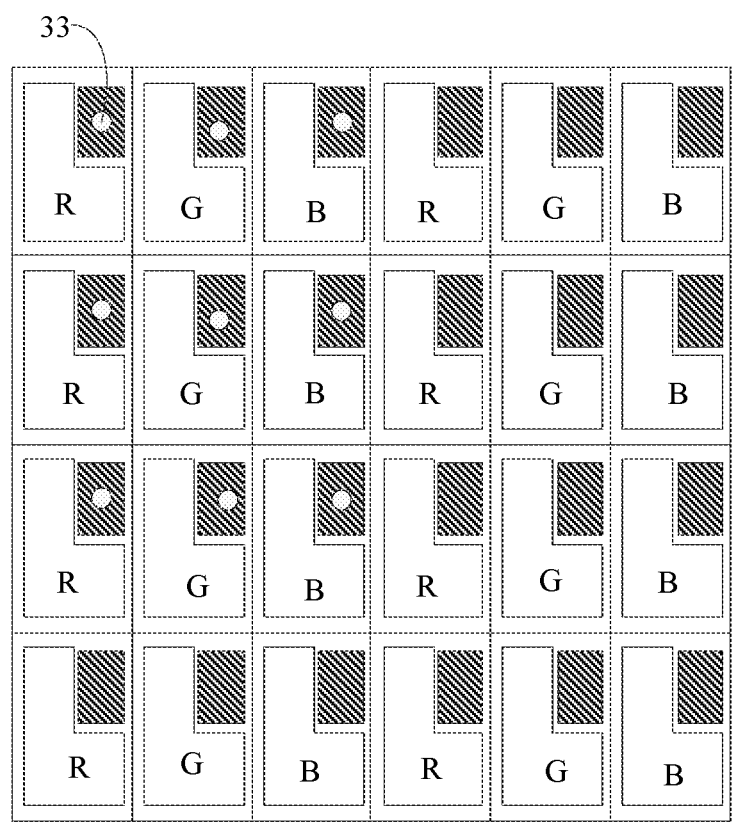
FIG. 3C is a structural diagram of positioning of a photosensitive device according to an exemplary embodiment of the present disclosure.

That is, a photosensitive device is disposed on each pixel subunit in the portion of the array substrate. As illustrated in FIG. 3C, the LCD panel includes 2×4 pixel units, and thus 8×3=24 pixel subunits. The LCD panel further includes 3×3=9 photosensitive devices. With respect to the 9 pixel subunits in the portion of the array substrate, a photosensitive device 33 is disposed on the TFT region of each of the 9 pixel subunits.

III. The photosensitive devices are disposed in the entire region of the LCD panel, and the photosensitive devices correspond to a portion of the pixel subunits in the array substrate. The photosensitive devices are dispersedly disposed in the LCD panel, where A<K×M and B<N, or A<K×M and B=N, or A=K×M and B<N.

Figure 3D:
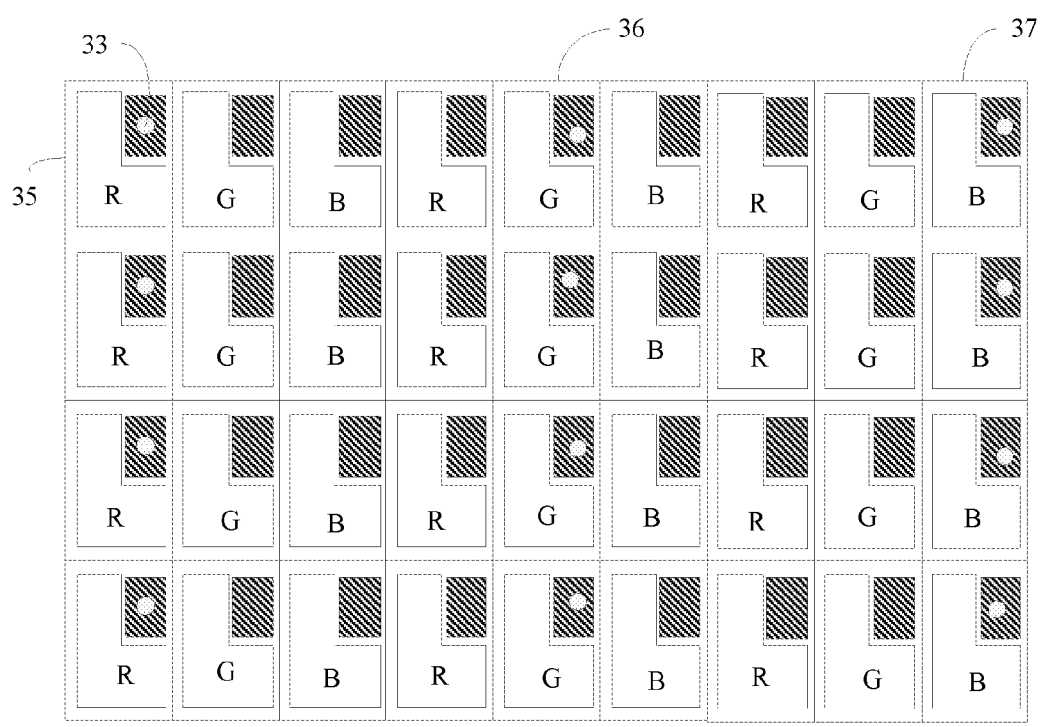
FIG. 3D is a structural diagram of positioning of a photosensitive device according to an exemplary embodiment of the present disclosure.

The photosensitive devices correspond to a portion of the pixel subunits in the array substrate, that is, the photosensitive devices are distributed uniformly in the entire region of the LCD panel. Each photosensitive device corresponds to a pixel subunit while some pixel subunits do not correspond to any photosensitive device. As illustrated in FIG. 3D, the LCD panel includes 3×4=12 pixel units, and thus 12×3=36 pixel subunits. The LCD panel further includes 3×4 photosensitive devices, that is, 12 photosensitive devices 33. Taking the first row of the array substrate as an example, when viewed from left to right, a photosensitive device 33 is disposed in the TFT regions of the R pixel subunit 35 of the first pixel unit, a photosensitive device 33 is disposed in the TFT region of the G pixel subunit 36 of the second pixel unit, and a photosensitive device 33 is disposed in the TFT region of the B pixel subunit 37 of the third pixel unit.

In the present embodiment, by providing photosensitive devices on the TFT regions of the corresponding pixel units, the normal display function of the pixel subunit may not be affected, avoiding that the transmittance performance of the LCD panel is affected by the photosensitive devices.

It should be noted that FIGS. 3B, 3C and 3D illustrate only several situations of the positioning of the photosensitive devices, and those skilled in the art may appreciate other situations of the positioning of the photosensitive devices by combining the above situations. The present disclosure does not exclude other possible positioning of the photosensitive devices.

Figure 4:
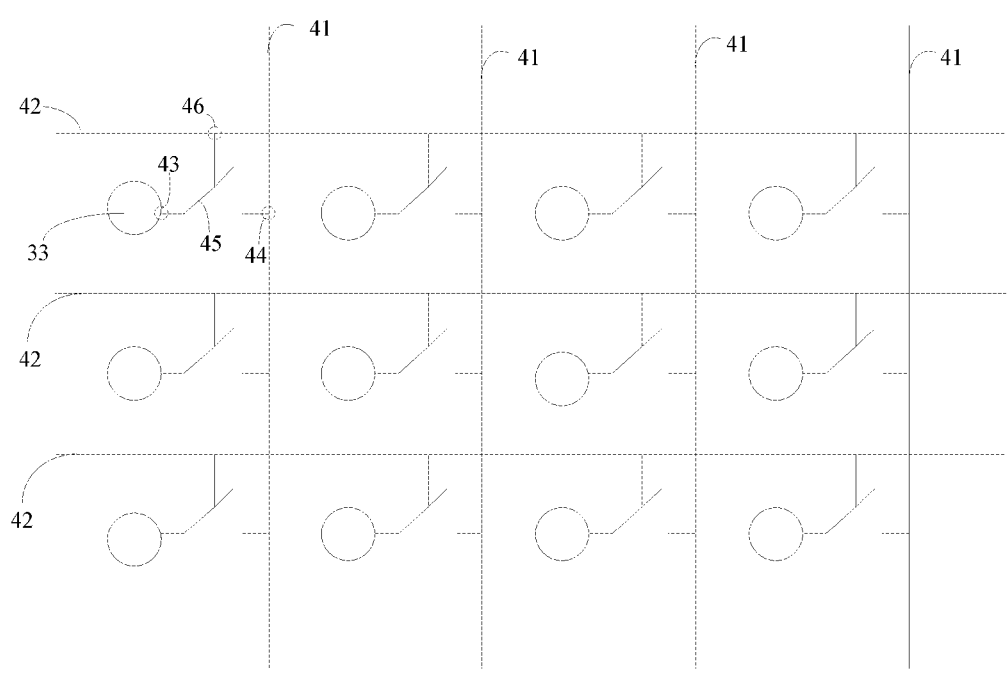
FIG. 4 is a schematic diagram of a control circuit according to an exemplary embodiment of the present disclosure.

FIG. 4 illustrates a control circuit connected with the photosensitive device array 330. The control circuit includes A columns of data lines 41 and B rows of control lines 42.

Each row of the control line 42 is coupled to A columns of data lines 41 via A switches 45, respectively, and each switch 45 has a control node 46 coupled to one of the control lines 42, a first connection node 43 coupled to a corresponding photosensitive device 33 and a second connection node 44 coupled to a corresponding data line 41.

Assuming that the control circuit illustrated in FIG. 4 includes 3 rows of control lines 42 and 4 columns of data lines 41, then 3×4 (i.e., 12) photosensitive devices are illustrated as an example. However, the value of A and B are not restrictive for the present disclosure.

Those skilled in the art would appreciate that the array substrate further includes "K×M" columns of pixel data lines and N rows of pixel control lines. In an embodiment, the pixel data lines and the pixel control lines are coupled to the pixel subunits via the TFT devices, so as to control the twisting angle of the liquid crystal in each pixel subunit on the array substrate. The control circuit having the pixel data lines and the pixel control lines connecting the TFT in the array substrate is similar to that illustrated in FIG. 4, which is not repeated herein.

Generally, in consideration of light transmission performance of the LCD panel, the control lines coupled to the photosensitive devices correspond to the respective pixel control lines on the array substrate, and data lines coupled to the photosensitive devices correspond to the respective pixel data lines on the array substrate.

Alternatively, each column of data line corresponds to a column of pixel data line, and each column of data line is disposed above the corresponding pixel data line.

If the column number of the data lines equals to that of the pixel data lines, i.e., if A=K×M, then each data line corresponds to one of the pixel data lines, and the data lines are disposed above the corresponding pixel data lines, respectively. When viewed from the front of the LCD panel, the data lines and the pixel data lines overlap with each other.

If the column number of the data lines is smaller than that of the pixel data lines, i.e., if A<K×M, then each of the A columns of data lines correspond to one of the pixel data line, and the data lines are disposed above the corresponding pixel data lines, respectively. When viewed from the front of the LCD panel, the data lines and a portion of the pixel data lines overlap with each other.

Alternatively, each row of control line corresponds to a row of pixel control line, and each row of control line is disposed above the corresponding pixel control line.

If the row number of the control lines equals to that of the pixel control lines, i.e., if B=N, then each of the control lines corresponds to one of the pixel control lines, and the control lines are disposed above the corresponding pixel control lines, respectively. When viewed from the front of the LCD panel, the control lines and the pixel control lines overlap with each other.

If the row number of the control lines is smaller than that of the pixel control line, i.e., if B<N, each of the B rows of control lines correspond to one of the pixel control lines, and the control lines are disposed above the corresponding pixel control lines, respectively. When viewed from the front of the LCD panel, the control lines and a portion of the pixel control lines overlap with each other.

In the present embodiment, by associating the data lines and control lines of the control circuit coupled to the photosensitive device array with the pixel data lines and pixel control lines in the array substrate, positioning the data lines above the corresponding pixel data lines and positioning the control lines above the corresponding pixel control lines, the normal display of each pixel subunit may not be affected. Thus, it is avoided that the photosensitive devices affect the transmittance performance of the LCD panel.

In an alternative embodiment modified from the embodiment of FIG. 3A, a lens is disposed at a photosensitive side of each photosensitive device. That is, the number of the lenses is equal to the number of the photosensitive devices.

Figure 5A:
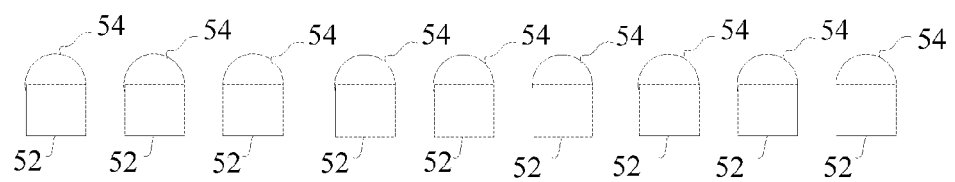
FIG. 5A is a structural diagram of an LCD panel according to an exemplary embodiment of the present disclosure.

As illustrated in FIG. 5A, a lens 54 is disposed above each photosensitive device 52. Optionally, the lens 54 is a half lens with a convex surface structure.

Figure 5B:
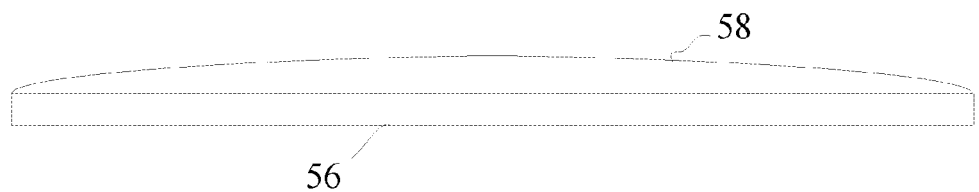
FIG. 5B is a structural diagram of an LCD panel according to an exemplary embodiment of the present disclosure.

Alternatively, a lens may be further disposed at a photosensitive side of photosensitive device array. That is, a lens that may cover all the photosensitive devices can be disposed on the photosensitive device array. As illustrated in FIG. 5B, a lens 58 is disposed on the photosensitive device array 58. Alternatively, the lens 58 is a half lens with a convex surface structure. Alternatively, the lens 58 is disposed on the upper polarizing sheet illustrated in FIG. 1.

In the present embodiment, by disposing a lens at the photosensitive side of the photosensitive device or the photosensitive side of photosensitive device array, the light sensing range of the photosensitive device can be improved, and thus image can be captured better.

Figure 6A:
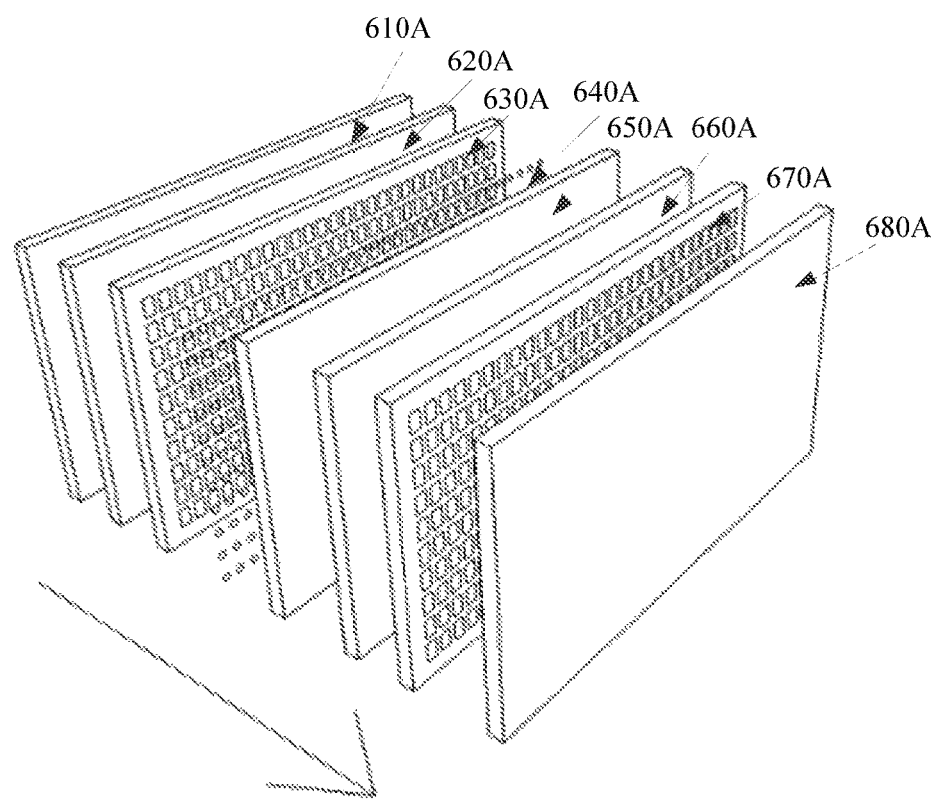
FIG. 6A is a structural diagram of an LCD panel according to an exemplary embodiment of the present disclosure.

In an alternative embodiment provided based on the embodiment of FIG. 3A, a photosensitive device array is disposed between the array substrate and the liquid crystal layer. As illustrated in FIG. 6A, the LCD panel includes a backlight source 610A, a lower polarizing sheet 620A, an array substrate 630A, a photosensitive device array 640A, a liquid crystal layer 650A, an upper substrate 660A, a color filter layer 670A, and an upper polarizing sheet 680A.

The lower polarizing sheet 620A is disposed on the backlight source 610A, the array substrate 630A is disposed on the lower polarizing sheet 620A, the photosensitive device array 640A is disposed on the array substrate 630A, the liquid crystal layer 650A is disposed on the photosensitive device array 640A, the upper substrate 660A is disposed on the liquid crystal layer 650A, the color filter layer 670A is disposed on the upper substrate 660A, and the upper polarizing sheet 680A is disposed on the color filter layer 670A. That is, the photosensitive device array 640A is disposed between the array substrate 630A and the liquid crystal layer 650A.

Alternatively, a lens (not illustrated) is disposed at a photosensitive side of each photosensitive device of the LCD panel.

Alternatively, a lens (not illustrated) is disposed at a photosensitive side of photosensitive device array of the LCD panel.

Figure 6B:
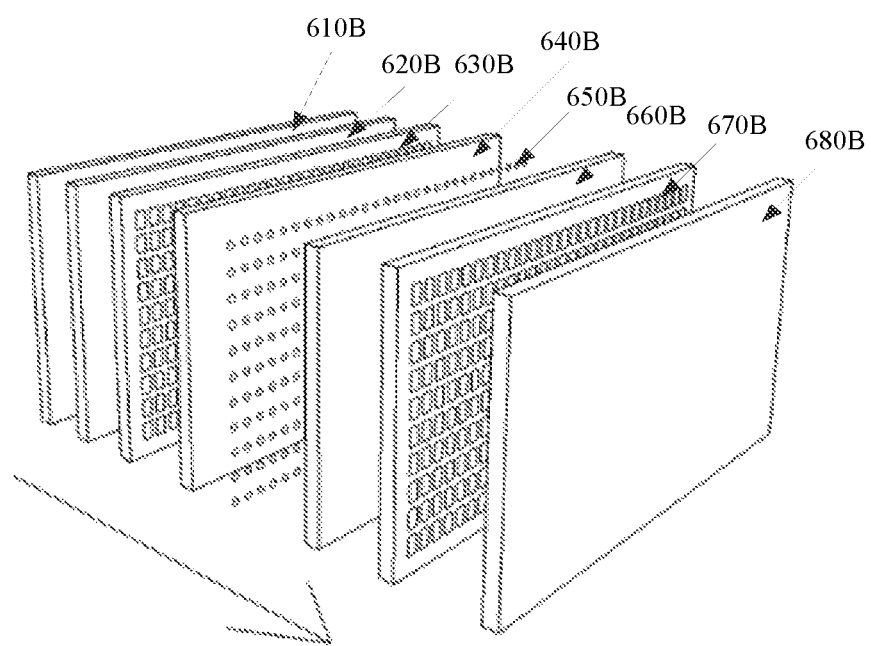
FIG. 6B is a structural diagram of an LCD panel according to an exemplary embodiment of the present disclosure.

In an alternative embodiment provided based on the embodiment of FIG. 3A, a photosensitive device array is disposed between the liquid crystal layer and the color filter layer. As illustrated in FIG. 6B, the LCD panel includes: a backlight source 610B, a lower polarizing sheet 620B, an array substrate 630B, a liquid crystal layer 640B, a photosensitive device array 650B, an upper substrate 660B, a color filter layer 670B, and an upper polarizing sheet 680B.

The lower polarizing sheet 620B is disposed on the backlight source 610B, the array substrate 630B is disposed on the lower polarizing sheet 620B, the liquid crystal layer 640B is disposed on the array substrate 630B, the photosensitive device array 650B is disposed on the liquid crystal layer 640B, the upper substrate 660B is disposed on the photosensitive device array 650B, the color filter layer 670B is positioned on the upper substrate 660B, and the upper polarizing sheet 680B is disposed on the color filter layer 670B. That is, the photosensitive device array 650B is disposed between the liquid crystal layer 640B and the color filter layer 670B.

Alternatively, a lens (not illustrated) is disposed at a photosensitive side of each photosensitive device of the LCD panel.

Alternatively, a lens (not illustrated) is disposed at a photosensitive side of photosensitive device array of the LCD panel.

Figure 6C:
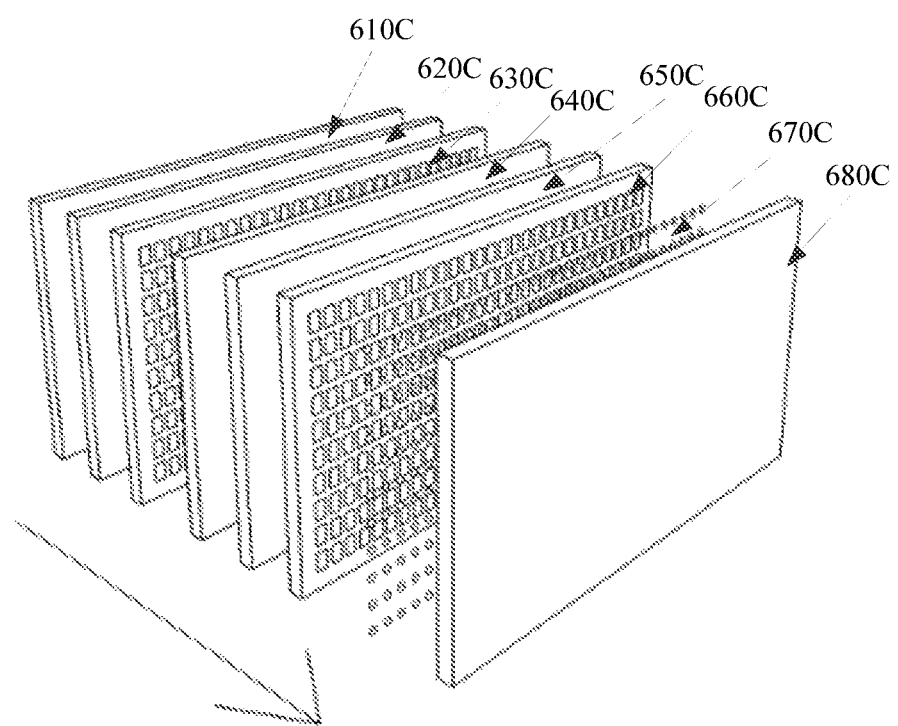
FIG. 6C is a structural diagram of an LCD panel according to an exemplary embodiment of the present disclosure.

In an alternative embodiment provided based on the embodiment of FIG. 3A, a photosensitive device array is disposed between the color filter layer and the upper polarizing sheet. As illustrated in FIG. 6C, the LCD panel includes: a backlight source 610C, a lower polarizing sheet 620C, an array substrate 630C, a liquid crystal layer 640C, an upper substrate 650C, a color filter layer 660C, a photosensitive device array 670C, and an upper polarizing sheet 680C.

The lower polarizing sheet 620C is positioned on the backlight source 610C, the array substrate 630C is disposed on the lower polarizing sheet 620C, the liquid crystal layer 640C is disposed on the array substrate 630C, the upper substrate 650C is disposed on the liquid crystal layer 640C, the color filter layer 660C is disposed on the upper substrate 650C, the photosensitive device array 670C is disposed on the color filter layer 660C, and the upper polarizing sheet 680C is disposed on the photosensitive device array 670C. That is, the photosensitive device array 670C is disposed between the color filter layer 660C and the color filter layer 680C.

Alternatively, a lens (not illustrated) is disposed at a photosensitive side of each photosensitive device of the LCD panel.

Alternatively, a lens (not illustrated) is disposed at a photosensitive side of photosensitive device array of the LCD panel.

Figure 7:
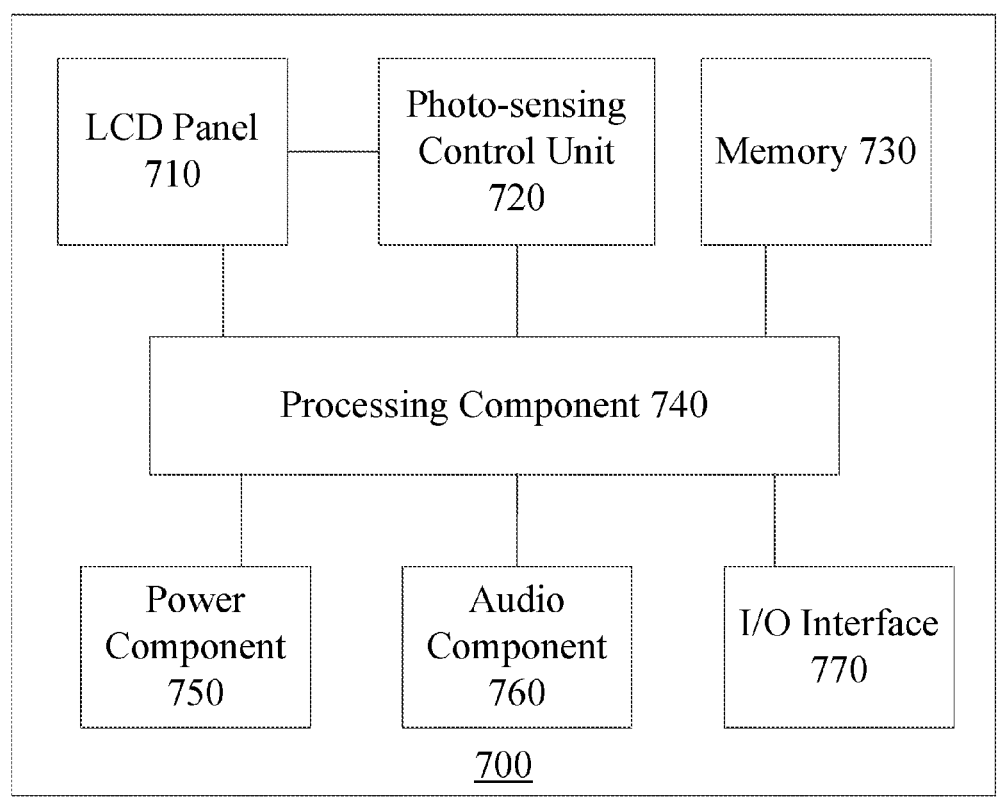
FIG. 7 is a block diagram of a terminal device according to an exemplary embodiment of the present disclosure.

FIG. 7 is a block diagram of a terminal device illustrated according to an exemplary embodiment of the present disclosure. As illustrated in FIG. 7, the terminal device 700 includes a LCD panel 710, a photo-sensing control unit 720, a memory 730, a processing component 740, a power component 750, an audio component 760, and an input/output (I/O) interface 770.

The LCD panel 710 may be an LCD panel illustrated in any one of FIGS. 3A, 5A, 5B, 6A, 6B and 6C provided in the above embodiments.

The photo-sensing control unit 720 is coupled to the control circuit in the LCD panel 710. The photo-sensing control unit 720 is coupled to each data line in the control circuit, respectively. The photo-sensing control unit 720 is coupled to each control line in the control circuit, respectively. The control circuit is coupled to the photosensitive device array in the LCD panel 710.

The memory 730 is configured to store various types of data to support the operation of the device 700. Examples of such data include instructions for any applications or methods operated on the device 700, contact data, phonebook data, messages, pictures, video, etc. The memory 730 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The processing component 740 typically controls overall operations of the device 700, such as the operations associated with display, telephone calls, data communications, camera operations, and recording operations. The processing component 740 may include one or more processors to execute instructions to perform all or part of the steps in the above described methods. Moreover, the processing component 740 may include one or more modules which facilitate the interaction between the processing component 740 and other components.

The power component 750 provides power to various components of the device 700. The power component 750 may include a power management system, one or more power sources, and any other components associated with the generation, management, and distribution of power in the device 700.

The audio component 760 is configured to output and/or input audio signals. For example, the audio component 760 includes a microphone ("MIC") configured to receive an external audio signal when the device 700 is in an operation mode, such as a call mode, a recording mode, and a voice recognition mode. The received audio signal may be further stored in the memory. In some embodiments, the audio component 760 further includes a speaker to output audio signals.

The I/O interface 770 provides an interface between the processing component 740 and peripheral interface modules, such as a keyboard, a click wheel, buttons, and the like. The buttons may include, but are not limited to, a home button, a volume button, a starting button, and a locking button.

Figure 8:
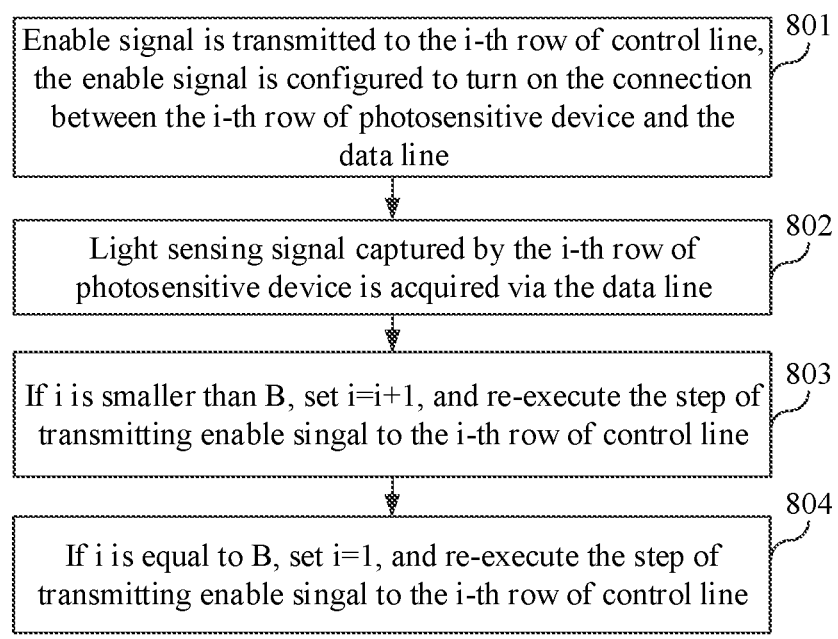
FIG. 8 is a flow chart of a photo-sensing control method according to an exemplary embodiment of the present disclosure.

FIG. 8 is a flow chart of a photo-sensing control method according to an exemplary embodiment of the present disclosure. In the present embodiment, for example, the photo-sensing control method can be applied in the photo-sensing control unit in the terminal device as illustrated in FIG. 7. The method includes the following steps.

In step 801, an enable signal is transmitted to the i-th row of the control line, and the enable signal is configured to turn on the connection between an i-th row of photosensitive device and a data line coupled to the i-th row of photosensitive device.

The enable signal is configured to turn on the connection between the i-th row of photosensitive device and the data line, or turn off the connection depending on the value of the enable signal. The photo-sensing control unit transmits the enable signal to the i-th row of control line in the control circuit, and the i-th row of photosensitive device is connected to the data line of the control circuit in response to the enable signal.

For example, assuming that the control circuit illustrated in FIG. 4 includes 4 columns of data lines 41 and 3 rows of control lines 42, and each row includes 4 photosensitive devices 33, i.e., totally 12 photosensitive devices 33. When the photo-sensing control unit transmits the enable signal to the first row of control line 41, all the switches 45 in the first row is turned on, and the 4 photosensitive devices 33 in the first row are in connection with corresponding data lines 41.

In step 802, light sensing signal captured by the i-th row of photosensitive device is acquired via the data lines.

The photo-sensing control unit acquires the light sensing signal captured by the i-th row of photosensitive device via the data lines. After acquiring the light sensing signal, the light sensing signal may be transmitted to the photo-sensing control unit only when photosensitive devices are connected with the data lines.

For example, assuming that the control circuit illustrated in FIG. 4 includes 4 columns of data lines 41 and 3 rows of control lines 42, and each row includes 4 photosensitive devices 33, i.e., totally 12 photosensitive devices 33. When the 4 photosensitive devices 33 in the first row are in connection with corresponding data lines 41, the photo-sensing control unit may acquire the light sensing signal captured by the 4 photosensitive devices 33 via 4 columns of data lines 41.

The light sensing signal transmitted to the photo-sensing control unit is an analog signal, the analog signal is converted into digital signal by an A/D convertor, and the digital signal is stored in the memory.

In step 803, if i is smaller than B, make i=i+1, and the step of transmitting enable signal to the i-th row of control is re-executed.

The sequence number of the row of the control line is represented by i, and the total number of the rows of the control lines is represented by B. If i is smaller than B, then set i=i+1. Accordingly, the photo-sensing control unit transmits the enable signal to the i+1-th row of control line. If i=B, then step 804 is executed.

For example, assuming that the control circuit illustrated in FIG. 4 includes 8 row of control lines, when the photo-sensing control unit transmits the enable single to the third row of control line for a predetermined period, i equals to 3 which is smaller than 8. Then, i is assigned with a value of 4, and the enable signal is transmitted to the fourth row of control line. This process is repeated until the enable signal is transmitted to the $8^{th}$ row of control line. That is, the photo-sensing control unit transmits the enable signal to the control lines progressively at predetermined time intervals.

In step 804, when i=B, set i=1, and the step of transmitting the enable signal to the i-th row of control line is executed again.

When i is equals to B, set i=1, and the photo-sensing control unit transmits the enable single to the first row of control line. That is, when the photo-sensing control unit has transmitted the enable signal to all the control lines for one time, it may start transmitting the enable single again to the control lines starting from the first row of control line.

After executing step 804, step 801 is executed again, and steps 801 to 804 are executed repeatedly. That is, i has an initial value of 1, and the enable signal is transmitted progressively from the highest row of control line to the lowest row of control line, thereby capturing the light sensing signal corresponding to the current frame. After that, once again, the enable signal is transmitted progressively from the highest row of control line to the lowest row of control line, thereby capturing the light sensing signal corresponding to the next frame.

In conclusion, in the photo-sensing control method provided in the present embodiment, by transmitting enable signal successively and progressively to the control lines in the control circuit from the photo-sensing control unit, photosensitive devices in the control circuit are in connection with the data lines, and the photo-sensing control unit receives continuously the light sensing signal via the connected data lines and processes the light sensing signal. Therefore, the camera function can be integrated into the LCD panel, and only the LCD panel is needed for the front panel of the terminal device which has both the display function and the camera function. The integration and appearance of the front panel of the terminal device is thus improved.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A liquid crystal display (LCD) panel, comprising:
a backlight source;
an array substrate disposed on the backlight source;
a photosensitive device array disposed on the array substrate; and
a control circuit coupled to the photosensitive device array;
wherein the array substrate comprises M×N pixel units, and each pixel unit comprises K pixel subunits;
wherein the photosensitive device array comprises A×B photosensitive devices, and each photosensitive device corresponds to one of the pixel subunits;
wherein each of M, N, K, A, and B is an integer greater than 0, and A≤K×M and B ≤N;
wherein the control circuit comprises A columns of data lines and B rows of control lines;
wherein each row of control line is coupled to A columns of data lines via A switches, respectively; and each switch comprises a control node coupled to the control line, a first connection node coupled to the corresponding photosensitive device, and a second connection node coupled to the corresponding data line;
wherein the array substrate comprises K×M columns of pixel data lines and N rows of pixel control lines;
wherein each column of data line corresponds to one of the K×M columns of pixel data lines, and is disposed on the corresponding pixel data line; and
wherein each row of control line corresponds to one of the N rows of pixel control lines, and is disposed on the corresponding pixel control line.

2. The LCD panel according to claim 1, wherein the pixel subunit comprises a transparent electrode region and a thin film transistor (TFT) region, and
wherein at least one of the photosensitive devices is disposed on the TFT region of a corresponding pixel subunit of the pixel subunits.

3. The LCD panel according to claim 1, wherein a lens is disposed on a photosensitive side of each one of the photosensitive devices.

4. The LCD panel according to claim 1, wherein a lens is disposed on a photosensitive side of the photosensitive device array.

5. The LCD panel according to claim 1, further comprising a liquid crystal layer disposed on the array substrate, and
wherein the photosensitive device array is disposed between the array substrate and the liquid crystal layer.

6. The LCD panel according to claim 1, further comprising a liquid crystal layer disposed on the array substrate, and a color filter layer disposed on the liquid crystal layer, and wherein the photosensitive device array is disposed between the liquid crystal layer and the color filter layer.

7. The LCD panel according to claim 1, further comprising a liquid crystal layer disposed on the array substrate, a color filter layer disposed on the liquid crystal layer, and an upper polarizing sheet disposed on the color filter layer, and
wherein the photosensitive device array is disposed between the color filter layer and the upper polarizing sheet.

8. A terminal device, comprising an LCD panel according to claim 1.

9. The terminal device according to claim 8, wherein the array substrate comprises M×N pixel units, and each pixel unit comprises K pixel subunits; and the photosensitive device array comprises A×B photosensitive devices, and each photosensitive device corresponds to one of the pixel subunits, and wherein A≤K×M and B≤N;
wherein the control circuit comprises A columns of data lines and B rows of control lines, and each row of control line is coupled to A columns of data lines via A switches, respectively; and each switch comprises a control node coupled to the control line, a first connection node coupled to the corresponding photosensitive device, and a second connection node coupled to the corresponding data line; and
wherein the terminal device further comprises a photo-sensing control module coupled to the data lines and the control lines.

10. The terminal device according to claim 9, wherein the array substrate comprises K×M columns of pixel data lines and N rows of pixel control lines, each column of data line corresponds to one of the K×M columns of pixel data lines and is disposed on the corresponding pixel data line, and each row of control line corresponds to one of the N rows of pixel control lines and is disposed on the corresponding pixel control line.

11. A photo-sensing control method for use with a photo-sensing control module coupled to an LCD panel according to claim 1, the method comprising:
transmitting an enable signal to an i-th row of control line to turn on the connection between an i-th row of photosensitive device and a data line coupled thereto;
setting i=i+1 and transmitting the enable signal to the i-th row of control line again if i is smaller than B; and
setting i=1 and transmitting the enable signal to the i-th row of control line again if i is equal to B.

12. A photo-sensing control method according to claim 11, wherein the array substrate comprises K×M columns of pixel data lines and N rows of pixel control lines,
wherein each column of data line corresponds to one of the K×M columns of pixel data lines, and is disposed on the corresponding pixel data line, and
wherein each row of control line corresponds to one of the N rows of pixel control lines, and is disposed on the corresponding pixel control line.

* * * * *